(12) United States Patent
Pruss et al.

(10) Patent No.: US 7,662,324 B2
(45) Date of Patent: Feb. 16, 2010

(54) POLYMER PROCESSING AID AND METHOD FOR PROCESSING POLYMERS

(75) Inventors: Eugene A. Pruss, Hamburg, NY (US); Thomas M. Clere, Orchard Park, NY (US); Stuart K. Randa, Wilmington, DE (US)

(73) Assignee: Saint-Gobain Ceramics & Plastics, Inc, Worcester, MA (US)

( * ) Notice: Subject to any disclaimer, the term of this patent is extended or adjusted under 35 U.S.C. 154(b) by 61 days.

(21) Appl. No.: 10/476,364

(22) PCT Filed: Apr. 30, 2002

(86) PCT No.: PCT/US02/13540

§ 371 (c)(1),
(2), (4) Date: Jun. 18, 2004

(87) PCT Pub. No.: WO02/088234

PCT Pub. Date: Nov. 7, 2002

(65) Prior Publication Data

US 2004/0220288 A1 Nov. 4, 2004

Related U.S. Application Data

(60) Provisional application No. 60/287,452, filed on Apr. 30, 2001.

(51) Int. Cl.
C08J 9/00 (2006.01)
C08L 23/00 (2006.01)
C08L 23/08 (2006.01)

(52) U.S. Cl. ............ 264/176.1; 264/211; 264/330; 264/331.15; 521/79; 521/89; 521/143; 521/145; 524/714; 524/742; 524/779

(58) Field of Classification Search ............... 521/79, 521/89, 143, 145; 524/714, 742, 779; 264/211, 264/176.1, 330, 331.15
See application file for complete search history.

(56) References Cited

U.S. PATENT DOCUMENTS

| 2,991,508 A | 7/1961 | Reuben et al. |
|---|---|---|
| 3,125,547 A | 3/1964 | Bratz et al. |
| 3,351,690 A | 11/1967 | Stover |
| 4,188,194 A | 2/1980 | Corrigan |
| 4,514,370 A | 4/1985 | Inoue et al. |
| 4,731,311 A | 3/1988 | Suzuki et al. |
| 4,801,445 A | 1/1989 | Fukui et al. |
| 4,863,881 A | 9/1989 | Ahrens et al. |
| 4,869,954 A | 9/1989 | Squitieri |
| 4,882,225 A | 11/1989 | Fukui et al. |
| 4,927,587 A | 5/1990 | Takahashi et al. |
| 5,011,870 A | 4/1991 | Peterson |
| 5,039,435 A | 8/1991 | Hanano |
| 5,116,589 A | 5/1992 | Hoenig |
| 5,194,480 A | 3/1993 | Block et al. |
| 5,213,868 A | 5/1993 | Liberty et al. |
| 5,234,712 A | 8/1993 | Howard |
| 5,283,542 A | 2/1994 | Ochiai et al. |
| 5,285,108 A | 2/1994 | Hastings et al. |
| 5,298,791 A | 3/1994 | Liberty et al. |
| 5,332,629 A | 7/1994 | Sumiya et al. |
| 5,374,036 A | 12/1994 | Rogers et al. |
| 5,508,110 A | 4/1996 | Howard |
| 5,510,174 A | 4/1996 | Litman |
| 5,528,462 A | 6/1996 | Pendse |
| 5,545,473 A | 8/1996 | Ameen et al. |
| 5,591,034 A | 1/1997 | Ameen et al. |
| 5,601,874 A | 2/1997 | Howard et al. |
| 5,610,203 A | 3/1997 | Buckmaster et al. |
| 5,614,319 A | 3/1997 | Wessels et al. |
| 5,681,883 A | 10/1997 | Hill et al. |
| 5,688,449 A | 11/1997 | Fox et al. |
| 5,688,457 A | 11/1997 | Henry et al. |
| 5,716,665 A * | 2/1998 | Vita et al. ............... 427/119 |
| 5,726,502 A | 3/1998 | Beddingfield |
| 5,738,936 A | 4/1998 | Hanrahan |
| 5,770,819 A | 6/1998 | Mehan |
| 5,783,308 A | 7/1998 | Leendersen |
| 5,849,316 A | 12/1998 | Mellul et al. |
| 5,854,155 A | 12/1998 | Kawasaki et al. |
| 5,898,009 A | 4/1999 | Shaffer et al. |
| 5,898,217 A | 4/1999 | Johnston |
| 5,907,474 A | 5/1999 | Dolbear |
| 5,926,371 A | 7/1999 | Dolbear |

(Continued)

FOREIGN PATENT DOCUMENTS

AU   9067727 A   6/1991

(Continued)

OTHER PUBLICATIONS

Rudin, A., et al., "Fluorocarbon Elastomer Aids Polyolefin Extrusion", Plastics Engineering, Society of Plastics Engineers, Inc., Greenwich, Conn., US, pp. 63-66, 1986.

(Continued)

Primary Examiner—Irina S Zemel (57) ABSTRACT

In an exemplary embodiment, the present method includes the stops of providing a polymer resin to be processed: blending particulate boron nitride (BN) and a fluorine-containing polymer with said polymer resin to provide a resin blend: heating said resin blend to obtain a desired flowability value: and processing said resin blend into a desired shape.

21 Claims, 5 Drawing Sheets

U.S. PATENT DOCUMENTS

| | | | |
|---|---|---|---|
| 5,945,217 | A | 8/1999 | Hanrahan |
| 5,945,478 | A | 8/1999 | Buckmaster et al. |
| 5,950,066 | A | 9/1999 | Hanson et al. |
| 5,962,122 | A | 10/1999 | Walpita et al. |
| 5,981,641 | A | 11/1999 | Takahashi et al. |
| 5,984,055 | A | 11/1999 | Strasser et al. |
| 5,985,228 | A | 11/1999 | Corrigan et al. |
| 6,048,511 | A | 4/2000 | Shaffer et al. |
| 6,124,579 | A | 9/2000 | Steinhauser et al. |
| 6,168,859 | B1 | 1/2001 | Mills et al. |
| 6,251,513 | B1 | 6/2001 | Rector et al. |
| 6,284,817 | B1 | 9/2001 | Cross et al. |
| 6,300,607 | B1 | 10/2001 | Steinhauser et al. |
| 6,541,111 | B2 | 4/2003 | Fauzi et al. |
| 6,585,039 | B2 | 7/2003 | Sagal et al. |
| 6,645,612 | B2 | 11/2003 | Pujari et al. |
| 6,660,241 | B2 | 12/2003 | Clere et al. |
| 6,713,088 | B2 | 3/2004 | Lodyga et al. |
| 6,764,975 | B1 | 7/2004 | Clere |
| 6,794,435 | B2 | 9/2004 | Clere |
| 6,867,445 | B2 | 3/2005 | Jang |
| 2001/0048179 | A1 | 12/2001 | Stewart et al. |
| 2002/0000651 | A1 | 1/2002 | Takizawa et al. |

FOREIGN PATENT DOCUMENTS

| | | |
|---|---|---|
| BR | 9006359 A | 9/1991 |
| CA | 20318324 | 6/1991 |
| CA | 2389963 A1 | 6/2001 |
| EP | 0 279 769 A2 | 8/1988 |
| EP | 432007 A | 6/1991 |
| EP | 0 479 387 A1 | 4/1992 |
| EP | 0 896 031 A2 | 2/1999 |
| EP | 0 939 066 A1 | 9/1999 |
| EP | 0 982 391 A1 | 3/2000 |
| FI | 9006048 A | 6/1991 |
| FR | 2655638 A | 6/1991 |
| JP | 61268763 A | 11/1986 |
| JP | 1038424 A | 2/1989 |
| JP | 1126661 A | 5/1989 |
| JP | 1160215 A | 6/1989 |
| JP | 89054379 B | 11/1989 |
| JP | 2034107 A | 2/1990 |
| JP | 2-164433 | 6/1990 |
| JP | 04321506 A2 | 11/1992 |
| JP | 5078106 A | 3/1993 |
| JP | 07157369 A2 | 6/1995 |
| JP | 2590908 B2 | 3/1997 |
| JP | 2590964 B2 | 3/1997 |
| JP | 09151324 A | 6/1997 |
| JP | 10194711 A | 7/1998 |
| JP | 10204300 A | 8/1998 |
| JP | 11116213 A | 4/1999 |
| JP | 11209618 A | 8/1999 |
| JP | 11005907 A2 | 10/1999 |
| JP | 2981002 B2 | 11/1999 |
| JP | 2003-508259 | 7/2000 |
| JP | 3290127 B2 | 6/2002 |
| JP | 2003-518185 | 6/2003 |
| NO | 9005289 A | 6/1991 |
| PT | 96113 A | 9/1991 |
| WO | WO 97/37828 | 10/1997 |
| WO | WO 01/46313 A1 | 6/2001 |
| WO | WO 01/83371 A2 | 11/2001 |

OTHER PUBLICATIONS

Rosenbaum, E., et al., "Boron Nitride as a Processing Aid for the Extrusion of Polyolefins and Fluoropolymers", Rapra Abstracts, Pergamon Press, Ltd., Oxford, GB, p. 168, 2000.

Canadian Office Action for CA 2389963 dated Jul. 24, 2008, 3 pages.

Rosenbaum, Eugene, "Extrusion of Molten Polymers with Processing Aids", Rheology and Processability of Teflon FEP Resins for Wire Coating, Chapter 8, Thesis, University of British Columbia, 1998, 38 pages.

Seth, Manish, "The Role of Surface Energy of Boron Nitride on Gross Melt Fracture Elimination of Polymers", Thesis, Chapters 1-3, University of British Columbia, Aug. 2001, 63 pages.

Seth, Manish, "The Role of Surface Energy of Boron Nitride on Gross Melt Fracture Elimination of Polymers", Thesis, Chapters 4-8, University of British Columbia, Aug. 2001, 72 pages.

N. Dean et al., "Novel Thermal Interface Material with Aligned Conductive Fibers", Johnson Matthey Electronics, Spokane, WA, 6 pgs.

Rosenbaum, E., et al. "Boron Nitride as a Processing Aid for the Extruxion of Polyolefins and Fluoropolymers", Polymer Engineering and Science, vol. 40, No. 1, pp. 179-190, Ja.

Quotation (Jun. 5, 1998) and Reguest for Quotation Form (May 15, 1998).

"Silicones & Silicon-Containing Polymers," Petrarch Systems Silanes and Silicones: Silicon Compounds Register & Review (1987).

Carborundum Boron Nitride Data Sheet, "Cosmetic Grade Boron Nitride Powders" (Jun. 1998).

Quotation (May 19, 1999) and Experimental Product Analysis for XP 11047 (May 18, 1999).

Phone Call Report (Oct. 20, 1998), Shipment Inforamtion for XP 1115 and Experimental Product Analysis (Oct. 23, 1998).

Quotation (Dec. 2, 1999) and Request for Quotation Form for Item 1, Item 2, and Item 3 (Nov. 30, 1999).

I. Jimenez et al., "Core-level Photoabsorption Study of Defects and Metastable Bonding Configurations in Boron Nitride", vol. 55, No. 18, The American Physical Society, pp. 12 025-12 037, 1997.

R. Trice, et al. "Investigation of the Physical and mechanical Properties of Hot-Pressed Boron Nitride/Oxide Ceramic compositions,", vol. 82, No. 9, J. A,/ Ceram. Soc., pp. 2563-2565, 1999.

Yip et al., "The Effect of the Boron Nitride on Melt Fracture in Blow Moulding Extrusion".

Hagio et al., J. Am. Cer. Soc., 72:1482-84 (1989).

Yip et al., "The Effect of the Boron Nitride Type and Concentration on the Rheology and Processability of Molten Polymers", ANTEC 1999, Tech. Papers, 45, New York (1999).

Rosenbaum, et al., "A New Processing Additive Eliminating Surface and Gross Melt Fracture in the Extrusion of Polyolefins and Fluoropolymers", Antec 1998.

Seth et al., "The Effect of Surface Energy of Boron Nitride Powders on Gross Melt Fracture Elimination", Antec 2001.

Japanese Office Action for JP 2006-523997 dated Apr. 7, 2009, 7 pages. English Translation.

\* cited by examiner

COEFFICIENT OF FRICTION
EXXON EXCEED RESIN TYPE 143 & 350D60
(6 INCHES PER MINUTE, 72 F AND 50% RELATIVE HUMIDITY)

| SAMPLE | FILM TO METAL | | FILM TO FILM | | REMARKS |
|---|---|---|---|---|---|
| | STATIC | DYNAMIC | STATIC | DYNAMIC | |
| 1. (Virgin 143) | 3.02* | 4.06* | 1.18 | 1.31 | |
| 2. (500 ppm BN) | 0.71 | 0.88 | 0.78 | 0.76 | |
| 3. (500 ppm BN) | 0.58 | 1.06 | 0.58 | 0.57 | |
| 4. (200 ppm BN) | 0.87* | 1.74* | 0.84 | 0.86 | |
| 5. (500 ppm BN let-down from 2500 ppm) | 0.86 | 1.38 | 0.79 | 0.82 | |
| 6. (Mix: 500 ppm BN from 2500 ppm conc. & 228 ppm Fl. Elas. from 350D60) | 0.70 | 0.86 | 0.65 | 0.67 | Scanning photos show a very small amount of BN particles on film surface |
| 7. (Resin 350D60 800 ppm Fl. Elas.) | 2.48* | 2.34* | 1.01** | 1.21** | Scanning photos show BN particles on film surface |
| 8. (Resin 350D60 880 ppm Fl. Elas.) | Sample did not slide | | 3.70* | 2.02* | Scanning photos show no BN particles on film surface |
| 9. (Mix: 500 ppm BN from 2500 ppm conc. & 640 ppm Fl. Elas. from 350D60) | 0.57 | 0.77 | 0.93 | 1.07 | |
| 10. (Mix: 500 ppm BN from 2500 ppm conc. & 640 ppm Fl. Elas. from 350D60) | 0.69 | 0.93 | 0.84 | 0.91 | |

\* a lot of data scatter--sample sticking     \*\* low frequency data scatter--minor sticking

FIG. 1

BLOWN FILM HAZE DATA
(ASTM D 1746)

| FILM SAMPLE | HAZE (AV. & 1 SIGMA) |
|---|---|
| 1 | 40 +- 9 |
| 2 | 50 +- 5 |
| 3 | 44 +- 1 |
| 4 | 35 +- 11 |
| 5 | 36 +- 13 |
| 6 | 48 +- 7 |
| 7 | 27 +- 3 |
| 8 | 58 +- 12 |
| 9 | 59 +- 18 |
| 10 | 65 +- 5 |

FIG. 2

| SAMPLE | EXTRUDER RPM | TAPEUP SPEED (FT./MIN) | #/HR. (SHEAR RATE) SEC 1 | FILM (MILS) | MELT PRES. (psi) | REMARKS |
|---|---|---|---|---|---|---|
| 1. | 12.7 | 14 | 20 (509) | 1.5 | 4720* | Slight melt fracture |
| 2. (500 ppm BN) | 12.7 | 14 | 20 (534) | 1.6 | 3810 | |
| 3. (500 ppm BN) | 18 | 21 | 29 (738) | 1.5 | 4750* | Slight melt fracture |
| 4. (200 ppm BN) | 16.6 | 21.0 | 21 (687) | 1.4 | 4700* | |
| 5. (500 ppm BN Let-down from 2500 ppm Conc.) | 12.2 | 13 | 17.3 (439) | 1.5 | 4700* | Slight melt fracture |
| 6. (Mix: 500 ppm BN & 228 ppm Fl. Elas.) | 12.5 | 13.0 | 18.5 (470) | 1.5 | 4700* | |
| 7. (Resin 350D60 800 ppm Fl. Elas.) | 12.5 | 13 | 18.5 (470) | 1.5 | 4700* | Streaking |
| 8. Resin 350D60 800 ppm Fl. Elas. | 20.7 | 25 | 33.8 (859) | 1.5 | 4730* | Streaking |
| 9. Mix: 500 ppm BN from 2500 ppm Conc. & 640 ppm Fl. Elas. from 350D60) | 25 | 31 | 42.4 | 1.6 | 3950 | |
| 10. Mix 500 ppm BN from 2500 ppm Conc. & 640 ppm Fl. Elas. from 350D60) | 34.5 | 44 | 58.5 | 1.5 | 4840* | |

*Pressure Limits Extrusion Rate

POLYMER PROCESSING AID AND METHOD FOR PROCESSING POLYMERS

TECHNICAL FIELD

The present invention is directed to a method and composition for processing polymers and, more specifically, to an aid for melt processing various polymers.

BACKGROUND ART

The processing of polyolefins and other polymers into films, sheets or tubes usually takes place by extrusion. In this process, the polymer is melted in an extruder and forced through a nozzle into the desired shape.

For economic reasons, the highest possible throughput through the extruder is typically desired. One way of increasing the throughput of an extruder is to increase the speed of the screw. However, the viscoelastic behavior of the polymer melt typically sets limits in this process which are well below the values which can be theoretically achieved by the machine. More specifically, if the extrusion rate exceeds a value that is dependent on the polymer to be processed, defects known as melt fracture occur in the surface of the extruded material.

Although those skilled in the art differentiate between various types of melt fracture, the characteristic of concern is a matte, rough surface of the extrudate, also known as "sharkskin". Several measures have been proposed for prevention of this undesired melt fracture. Another important melt fracture mechanism is gross melt fracture, which take the form of severe irregular distortions at higher throughput rates at which sharkskin effects are seen.

As temperature is increased, melt fracture is displaced towards higher shear rates. Accordingly, it is possible to increase temperature to move to higher sustainable shear rates. However, this method can only be employed to a limited extent. Increasing processing temperatures increases operation costs, produces heat dissipation problems and can result in discoloration and thermal degradation of the polymer.

Another possibility involves modifying the extruder nozzle geometry. Nozzles having a relatively large cross-section produce a relatively high material throughput at the same shear rate. This measure is employed typically in the production of monoaxially or biaxially stretched films in which the relatively thick film obtained due to the enlargement of the nozzle slit can be adjusted to the desired thickness by means of a relatively large stretching ratio. Of course, this process cannot be used in all applications.

Another way of avoiding melt fracture comprises modifying the viscoelastic behavior of the polymer melt by means of additives. Examples of such additives, which are generally compatible with the polyolefin include low-molecular-weight polyethylene waxes. However, highly compatible additives may adversely affect the properties of the polymer (e.g., tear resistance).

Another method involves modifying the interactions of the polymer melt with the nozzle walls by means of suitable additives. Such additives are generally not compatible with the polymer. They migrate to the boundary layer between the polymer melt and the nozzle wall where they act as lubricants.

It is known to use specific fluorine-containing polymers, and in particular fluroelastomers, as processing auxiliaries for polyolefins (see U.S. Pat. No. 3,125,547). These fluorine-containing polymers are generally obtained from vinylidene fluoride, vinyl fluoride, hexafluoropropene, chlorotrifluoroethylene or tetrafluoroethylene. However, further improvement in the flow behavior continues to exist in the art.

Furthermore, linear polyolefins, such as linear polyethylene, blended with fluoroelastomer processing aids in particular can be especially difficult to melt process, as compared to highly branched polyethylenes. In particular, while addition of fluoroelastomer may be effective to reduce sharkskin effects, such additives typically do not have an impact on the onset of gross melt fracture.

Increasing motor load, head pressure and/or torque can place undesirable, unacceptable, or unattainable requirements on specific machinery. For example, a given extruder having a specific motor power and gearing will reach a maximum of motor load or head pressure under certain melt temperature conditions for a given polymer being processed. If a polymer or polymer blend is introduced to such an extruder having a higher requirement for power in at least one component, such as a polymer having higher molecular weight and/or narrower molecular weight distribution and/or lower shear sensitivity, the extruder will reach a maximum of one or several of these parameters and, consequently, be limited in its ability to pump/perform at a similar level to the performance expected/demonstrated with a highly branched or broader molecular weight distribution polymer. Even highly adjustable, high performance melt processing machinery, that can withstand the higher loads, consumes more power in processing the aforementioned linear polyethylenes.

Linear polyethylenes and elastomeric blends thereof may exhibit other imperfections during extrusion (specifically blown film extrusion) that may be undesirable, such as gross melt fracture and/or sharkskin effects (discussed supra). Melt fracture can have a deleterious effect on optical properties and/or physical properties of the film. Typically, when a linear or high molecular weight thermoplastic resin is extruded through a die, smooth extrudates can only be obtained up to a certain shear stress (i.e., shear rate; extruder output rate). Beyond that, melt fracture becomes a significant problem. Therefore, it would be desirable to identify process aids that delay, suppress or eliminate the onset of melt fracture to enable operation at higher shear rates or output rates without surface defects, non-uniform cross-sectional thickness polymer decomposition (charring), or die drool.

In the case of polyolefin resins, even the employ of the above described process aids falls short when it comes to the industry's appetite for ever increasing production rates. This quest for higher extrusion rates, which is driven primarily by economic considerations related to the efficient use of processing equipment and human resources, is of particular interest to producers of melt processable polymer products, for example, blow film, blowmolded products, etc.

As the demand for high performance plastics continues to grow, new and improved methods of providing superior product more economically are needed to supply the market. In this context, various polymer process aids and process improvements are constantly being evaluated; however, the identities of improved and/or additional effective process aids continue to elude the industry. Consequently, a long felt, yet unsatisfied need exists for new and improved methods and compositions for processing polymers.

DISCLOSURE OF INVENTION

Accordingly, the present invention is directed to a method and processing aid for processing polymers. In one embodiment, the present method includes the steps of providing a melt processable polymer to be processed; blending a processing aid with the melt processable polymer, the processing aid containing at least one foam cell nucleant, such as particulate boron nitride (BN) and at least one fluoropolymer with said melt processable polymer (bulk polymer resin) to provide a resin blend (feedstock polymer blend), and processing the feedstock polymer blend. Generally processing is carried out by heating said feedstock polymer blend to obtain a desired flowability; and extruding the feedstock polymer blend into a desired shape.

The nucleant(s) and fluoropolymer(s) can be added at various points during the process, such as after the resin is heated thereby producing an admixture or suspension. In another alternative embodiment, the nucleant can be added to the fluoropolymer, where both the nucleant and the fluoropolymer are in powder forms, and processing the powder mixture. Here, the powder mixture generally contains a powder of the melt processable polymer, which is the same as the or compatible with the bulk melt processable polymer. The powder mixture containing the nucleant, fluoropolymer (generally fluoroelastomer) and melt processable polymer is called a 'master batch.' The master batch is typically extruded into pellets which are then added in desired concentrations to the bulk melt processable polymer, which may also be in pellet form. Formation of a master batch in this regard has been found to promote dispersion of the nucleant during processing, and improve rheological properties of the melt during extrusion. Nucleant and fluoropolymer are present in effective amounts, which may vary in discrete applications. Various combinations of fluoropolymers can be used to tailor the characteristics of the target polymer. It has been found that various embodiments of the present invention can aid in the processing of polymers and can improve their processing rate and conditions, as well as the final characteristics of the processed polymer.

Depending on the specific embodiment employed, advantages of the present invention may include the ability to modulate and control the coefficient of friction of the processed polymer; production of smoother polymer films; increased control of thickness of the produced polymer films (improved gauge); haze reduction in the polymer films; anti-blocking effects; reduced or controlled melt pressure during extrusion; reduction or elimination of die drool; postponement of melt fracture, such as sharkskin effects and gross melt fracture, to higher shear rates; allow for modified extrusion operation to improve product quality (e.g., lower temperature to improve cross-sectional control or surface quality), reduction of polymer decomposition or charring, and possibly reduction of undesirable gel formation and reduction or elimination of film streaking.

BRIEF DESCRIPTION OF DRAWINGS

The present invention may be better understood, and its numerous objects, features, and advantages made apparent to those skilled in the art by referencing the accompanying drawings.

Various features, aspects, and advantages of the present invention will become more apparent with reference to the following description, appended claims, and accompanying figures, wherein

FIG. 4 is a Weibull distribution curve obtained from analyzing the thickness of a blown film, where FIG. 4 shows the distribution curve of film thickness across a circumference of the blown film formed of 210 ppm fluoroelastomer and 70 ppm BN in Escorene 1001.29 at extrusion near stability at 75.0 pounds per hour at 42.2 rpm; and FIG. 5 is another Weibull distribution curve obtained from analyzing the thickness of a blown film, where FIG. 4 shows the distribution curve of film thickness across a circumference of a comparative blown film formed of 280 ppm fluoroelastomer in Escorene 1001.29 at extrusion near stability at 70.9 pounds per hour at 39.4 rpm.

The use of the same reference symbols in different drawings indicates similar or identical items.

MODE(S) FOR CARRYING OUT THE INVENTION

The present invention is directed to a method and processing aid for processing polymers as described above. The polymer to be processed can be any thermoplastic polymer, copolymer, or blend that would benefit from increased melt-processing properties. As used herein, the polymer which is to undergo processing (sometimes referred to herein as the 'bulk' polymer) is generally a melt processable polymer. The present method is especially applicable to linear polyolefins and elastomer blends containing the same. The method is applicable to metallocene polyolefins and linear polyolefins. Preferably, the polymer is a linear polyethylene and, more preferably, a linear low-density polyethylene or copolymer containing the same. It is contemplated that the present method will benefit the processing of high melt extruded polypropylenes, ultra-high molecular weight polyethylene, dynamically vulcanized alloys and other difficult to process elastomers.

The polymer may contain various additives and modifiers, such as UV stabilizers, slip additives anti-blocking agents, foaming agents, flame retardant components, colorants, and fillers (e.g., minerals), to adjust the properties of the polymer. Such additives may be first provided in the master batch (discussed in more detail hereinbelow), for subsequent mixing with the bulk melt processable polymer. Slip additives include saturated (and unsaturated) fatty acid amides, metal salts of fatty acids, and waxes, for example. Antiblock agents may include fatty acid amides as noted above, Diatomaceous earth, silica, zeolites, waxes, calcium carbonate, talc, and others.

The foam cell nucleant is preferably provided as a powder. BN represents a preferred form of the nucleant. In this regard, use may be made of commercially available BN powders. One embodiment makes use of hexagonal boron nitride (h-BN) having an aspect ratio of at least 2, such as from about 50 to about 300. In this context, the term "aspect ratio" is the value determined by dividing particle diameter by particle thickness. In this regard, the h-BN particles can be obtained by a milling process, which exposes newly cleaved BN surfaces to oxidizing agents in the atmosphere thereby producing $B_2O_3$ on the newly exposed surfaces. High residual $B_2O_3$ content may enhance dispersion of the nucleant (BN) within the melt. Thus, preferably, the h-BN powder has at least 0.5 wt % $B_2O_3$, more preferably, from about 0.5 wt % to about 5 wt % $B_2O_3$.

Although BN powders having relatively high $B_2O_3$ content may be utilized according to certain embodiments of the present invention, commercially available BN powders may be utilized that have comparatively lower levels, such as 0.02 to about 0.10 wt %.

The BN is provided in an effective amount Unless otherwise noted, the term "effective amount" means an amount of a substance which advantageously affects a processing characteristic of the subject polymer or a characteristic of the finished product beyond that attained in the absence of said substance. Preferably, BN is present in an amount less than 5000 ppm in the polymer and greater than 10 ppm, more preferably, from about 50-1000 ppm or, most preferably, from about 100-500 ppm. In certain embodiments, BN is provided in the feedstock polymer blend in an amount less than 500 ppm, such as less than 200 ppm, and even less than 100 ppm. As discussed in more detail below, the relatively low concentration of BN, and in particular relatively low concentrations of BN with respect to the fluoropolymer additive, provides superior melt extrusion properties and characteristics in the final product obtained after extrusion.

The h-BN described herein can be produced by milling h-BN powder in a milling mixture under conditions effective to produce delaminated h-BN powder having an aspect ratio of from about 50 to about 300.

One method of producing a starting powder is "high fire" treatment of a raw, essentially turbostratic (amorphous) boron nitride powder (see Hagio et al., "Microstructural Development with Crystallization of Hexagonal Boron Nitride," *J. Mat. Sci. Lett.* 16:795-798 (1997), which is hereby incorporated by reference). In a preferred embodiment, a fine turbostratic BN powder having a crystallization index of less than 0.12 is heat treated in nitrogen at about 1400 to 2300° C. for about 0.5-12 hours. This heat treatment typically acts to produce a more coarse h-BN powder, as the fine, <1 μm crystallites, of turbostratic powder particles become more ordered (crystallized) and larger (>1 micron) during the heat treatment. In typical embodiments, the high fired h-BN powder has a particle size of between 1 and 20 μm, more typically between 4 and 9 μm.

Typically, the virgin h-BN powder comprises between about 5 and 30 wt % of the milling mixture. If substantially less than 10 wt % is used, production efficiencies may decline. If more than 30 wt % is used, then the viscosity of the milling slurry may increase, leading to less efficient milling.

Preferably, the milling mixture includes milling media and a milling liquid. The milling liquid may be water, methanol, ethanol, propanol, butanol, isomers of low molecular weight alcohols, acetone, and supercritical $CO_2$. In one embodiment, the liquid is any liquid in which $B_2O_3$ is soluble.

Typically, the milling liquid comprises between about 70 and 95 wt % of the milling mixture. If less than 70 wt % is used, the viscosity of the slurry may be too high for efficient milling. If more than 95 wt % is used, then there may be a sacrifice in productivity and the added burden of removing a larger volume of solvent if a dry powder is desired.

Milling media may have an average diameter of from about 1 mm to about 20 mm. Preferably, milling media are coarse milling media having an average diameter of at least 3 mm. Suitable milling media include zirconia, steel balls, alumina, silicon nitride, silicon carbide, boron carbide, calcium oxide, and magnesium oxide. The size of the milling media can also be used to affect the aspect ratio of the milled material. In particular, milling with fine 1 mm zirconia produces an h-BN powder having a smaller particle diameter than an h-BN powder similarly milled with ⅛" steel balls.

In some embodiments, a dispersant can be used in order to lower the viscosity of the milling slurry. Suitable dispersants include Rohm & Haas Duramax 3019, Rhodapex CO/436, Nekal, and the Triton series. In other embodiments, between about 1 and 20 wt % alcohol can be used to assist in the wetting of the h-BN by the water.

Typically, the milling of the h-BN powder is undertaken by a wet milling approach, e.g., in a ball mill, attrition mill, or vibratory mill. If a ball mill is used, then the preferred milling media are steel or other suitably magnetic materials to aid in the removal of milling debris by magnetic separation.

In situations in which high aspect ratio h-BN is desired, milling times of between 8 and 48 hours are preferred. If milling is performed for less than 8 hours, there may be insufficient delamination. If milling is performed for more than 48 hours, there is the added cost of increased milling time. However, as milling time increases, surface area of the BN particles in the resulting powder can increase.

In some applications, the temperature of the milling mixture may increase significantly during the milling operation. Since the production of $B_2O_3$ increases according to an Arrhenius rate law with temperature, it is possible that this increase in temperature may affect the ultimate $B_2O_3$ concentration. Therefore, in embodiments in which low $B_2O_3$ powders are desired, the temperature can be maintained at or below about 30° C. Otherwise, the temperature of the milling mixture can be increased.

The selection of the milling liquid should depend upon the desired aspect ratio of the h-BN. For example, if a highly delaminated, high aspect ratio h-BN powder is desired, then the liquid can be one that readily removes $B_2O_3$ from the h-BN particle (to prevent particle fracture and promote delamination). In these cases, the liquid should be one in which $B_2O_3$ is highly soluble (i.e., in which $B_2O_3$ has a solubility of at least 0.01 grams/cc). Given the $B_2O_3$ solubility in the selected milling liquid, a material balance calculation may be used to determine the minimum ratio of milling liquid volume to total $B_2O_3$ to achieve effective removal of $B_2O_3$ from the BN surface. On the other hand, if the mechanism for producing high aspect ratio BN platelets is shear milling, then any liquid of sufficient density can be used in combination with milling media.

It may also be desirable to produce tailored BN particles, which are not only very thin, but also somewhat fine, e.g., a powder having thin platelets on the order of 1-2 microns in diameter. This may be achieved by combining the aforementioned wet milling method with dry milling (see, e.g., Hagio et al., *J. Am. Cer. Soc.* 72:1482-84 (1989), which is hereby incorporated by reference) in order to produce both delaminated and fractured h-BN particles. In particular, when the average particle size of the h-BN powder is between about 1 and 10 microns, a change in the particle size does not effectively change the specific surface area of the particles produced. In such instances, a slight reduction in the diameter of the powder provides the benefit of providing about two to four times as many particles (which typically improves the homogeneity and, therefore, the performance of the BN) without losing the benefits of high specific surface area. Therefore, in a preferred embodiment, the method includes dry milling the boron nitride powder under conditions effective to produce delaminated particles having a diameter of from about 1 μm to about 2.5 μm. More preferably, the resulting milled h-BN powder has a high aspect ratio and therefore a surface area of at least about 20 $m^2$/g (preferably at least about 40 $m^2$/g) and a thickness Lc of no more than about 50 nm (preferably no more than about 20 nm), and the particle diameter $D_{10}$ is between about 1 μm and 2.5 μm, more preferably between about 1 μm and 2.25 μm.

Preferably, the dry milling is carried out after milling the BN powder in the milling mixture including milling media and milling liquid ("wet milling"). However, the dry milling could also be carried out before the wet milling step.

The fluoropolymer processing aids that can be used in the practice of the present invention include those known in the art to mitigate effects such as melt fracture, high extrusion pressure, formation of deposits at the die exit and fluctuations in extrusion pressure or extrusion rate. They include the broad class of fluoropolymers as particulates or that are molten or fluid at the relevant processing temperature of the polymer, including fluoropolymers (e.g., PTFE), fluoroelastomers (e.g., from DDE & Dyneon) and fluoroplastics with relatively low melting temperature. Such low-melting fluoroplastics include but are not limited to polyvinylidene fluoride (PVDF), copolymers of tetrafluoroethylene (TFE) and hexafluoropropylene (HFP), copolymers of TFE and perfluoro(methyl vinyl) ether, and copolymers of TFE, HFP and vinylidene fluoride ($VF_2$). The fluoropolymer processing aids suitable for used in the practice of the present invention also include various multi-component processing aid systems, in which at least one fluoropolymer is used in conjunction with other material. Other material can also be fluoropolymer, compositionally different from first fluoropolymer. In general, suitable fluoropolymer processing aids have fluorine to carbon ratio of at least 1:2, and preferably at least 1:1. Among the preferred fluoropolymers are the $VF_2$/HFP fluoroelastomers that typically contain 30-70 wt % $VF_2$, 30-70 wt % HFP, and 0-40 wt % TFE.

Preferred thermoplastic fluoropolymers that may be used in the invention include homopolymers and copolymers of tetrafluoroethylene (such as Teflon.RTM™ FEP fluorocarbon resin) and polyvinylidene fluoride. Fluoroelastomer processing aids may be preferred over fluoroplastic polymers, and suitable fluoroelastomer process aids include, e.g., Dynamar® fluoroelastomer available from Dyneon and Viton® fluoroelastomer available from DuPont Dow Elastomers. Other preferred fluoropolymers include stabilized polyvinylidene fluoride resins, such as Kynar® PVDF resin, available from Atofina Chemicals, Inc.

Fluoropolymers are provided in effective amounts. Preferably, a fluoropolymer is present in an amount less than 5000 ppm in the polymer to be processed, more preferably, greater than 10 ppm, such as from about 100-1000 ppm or, most preferably, from about 200-800 ppm.

According to a particular embodiment of the present invention, the ratio of fluoropolymer to nucleant is specified in the feedstock polymer blend (as well as the master batch). This specification of the relative amounts of each of these processing aid components is a significant characteristic beyond the designation of amounts of nucleant and fluoropolymer. The present inventors have discovered that it is not only important to control the amounts of each of the components within the ranges disclosed herein, but to control the relative amounts of the components relative to each other. Unexpectedly, by utilizing a low nucleant content relative to fluoropolymer content, several advantages have been realized. For example, extruded products with superior clarity, smoothness and uniformity (gauge control) have been provided. In addition, the present inventors have discovered that by using relatively low amounts of nucleant (such as BN) with respect to the fluoropolymer, the coefficient of friction between the melt during extrusion and the die walls can be tailored easily. This characteristic is important, and friction coefficient tailoring is important for industrial applications. For example, for some production environments, it is desirable to have a coefficient of friction below one (1.0), others above one (1.0).

In accordance with the forgoing, the feedstock polymer blend (as well as the master batch) are rich in fluoropolymer content as compared to BN content. The ratio (generally weight ratio) of fluoropolymer to nucleating agent is generally greater than 1:1, and typically greater than 1.5:1. More typically, embodiments have a ratio of at least 2:1, 2.5:1, 3:1, and 3.5:1. Particular embodiments have had ratios on the order of 8:1 to 10:1 and higher. Working examples were prepared with ratios of 135:65, 650:100, 320:80, and comparative examples at 100:100 (1:1).

Dispersion of the BN may be promoted by premixing or "compounding" the fluoropolymer or a dispersant with the BN to produce a highly concentrated, but well dispersed mixture of the two that can then be added to the polymer to impart the desired level of process aid. Dispersion of the BN powder may also be facilitated by coating the BN powder with other agents containing fluorine, chlorine, bromine atoms, e.g., low molecular weight polyethylenes, siloxanes, fluorinated siloxanes, or compounds with conjugated bonds (double bonds, triple bonds, aromatic ring systems, and the like). In an alternative embodiment, the method includes mixing a polymer resin/BN blend with a batch containing virgin polymer resin to achieve a desired concentration of BN powder in the extrusion product. Blending can be carried out in a mixer, such as a v-blender, ribbon blender, or the like.

The foregoing compounding is an important feature according to certain embodiments of the present invention. In this regard, typically the fluoropolymer and the nucleant are combined in powder forms. Use of powder processing is desirable to improve the dispersion of the processing aid, and in particular the nucleant component of the processing aid. As used herein, powder means a mass of particles having a normal particle size less than about 1 mm, typically on the order of 1-100 microns, preferably less than 25 microns for the coarsest particles[for the nucleant such as BN and on the order of 1000-2000 microns for the fluoropolymer. Powder forms of the nucleant include single crystal domain particles as well as agglomerates, which typically have multiple crystal domains bonded together. The powders of fluoropolymer and nucleant are mixed together to form a master batch, and melted and extruded into master batch pellets. The master batch pellets are then used to add the active components (nucleant and fluoropolymer processing aid) to the bulk polymer blend.

Typically, the master batch does not contain solely the nucleant and fluoropolymer. Rather, the master batch preferably further contains a melt processable polymer, either the same polymer with which the master batch pellets are combined or a melt processable polymer that is compatible with the bulk melt processable polymer. Like the BN and the nucleant, the melt processable polymer is also added in powder form. It is mixed with the BN powder and the nucleant powder, and subsequently extruded in the master batch pellets. The addition of melt processable polymer in the master batch is effective to lower the concentration of the polymer processing aid contained in the master batch. Lowering of the concentration is desirable, as it aids in addition of precise amounts of processing aid into the bulk melt processable polymer (i.e., more accurate control over the concentration of the processing aid in the melt and the final extruded product). It is typical that the master batch contains not more than about 20 wt % of processing aid, the balance being substantially melt processable polymer. Even more typical, the batch contains not more than 10 wt % processing aid, such as less than 5 wt %. Particular examples contained 3 wt %. Other additives may be included in the master batch, such as UV stabilizers, anti-blocking agents, foaming agents, slip agents, flame retardant components, colorants, and fillers.

Following completion of the master batch, pellets of the master batch are then typically combined with pellets of the bulk melt processable polymer thereby forming a feedstock blend for processing As stated above, addition of melt processable polymer to the processing aid to form a master batch having a low concentration of processing aid improves accuracy and process control over the amount of processing aid that is contained in the final melt and extruded product. Given the concentration of the processing aid in the master batch, typically no greater than 20 wt % of the feedstock polymer blend (i.e., the combination of the master batch and the bulk polymer). Generally, the bulk melt processable polymer is combined with the master batch within a ratio of about 1:5 to about 1:1000, more typically, 1:10 to about 1:200.

Other processing aids may be used in combination with foam cell nucleant and fluoropolymer to further enhance a target characteristic of the polymer to be processed. Likewise, two or more fluoropolymers (e.g., PTFE and PVDF) may be used in combination with the foam cell nucleant (e.g. calcium tetraborate and boron nitride). Alternatively, a combination of foam cell nucleants may be used in conjunction with one or more fluoropolymers as required in discrete applications.

As used herein, the term "processing" means forming a polymer of interest into a desired shape. Generally, however, processing incorporates an extrusion process, during which the feedstock polymer blend (bulk melt processable polymer, and processing aids and additives) is melted and forced through a die. A non-exclusive list of methods for processing the polymer blend includes injection molding, blow molding, extrusion coating, film casting, film blowing, transfer molding, and the like. Processing also include blow molding parison for making monoaxial and biaxial oriented bottles. Desired shapes of the processed polymer may include flat films, cylindrical films, fibers, filaments, laminates, coatings, electrical insulation, tubing, lined pipe, injection molded containers, parts, or any shape of interest in a given application.

Suitable extruders include single screw or twin screw extruders, as are known in the art (see U.S. Pat. No. 5,688,457 to Buckmaster et al., which is hereby incorporated by reference). Likewise, extrusions methods are well known to skilled practitioners (see, e.g., U.S. Pat. Nos. 2,991,508; 3,125,547; 5,688,457 to Buckmaster et al.; Yip et al., ANTEC 1999, Tech Papers, 45, New York (1999), which are hereby incorporated by reference). One exemplary embodiment of the present invention comprises providing a blend of BN powder and fluoroelastomer powder (i.e., processing aid blend). The processing aid blend and particulate polymer to be processed are blended in a mixer. The blend is fed to a hopper, which feeds the extruder. The blend is melted in the extruder, which imparts sufficient shear to disperse the BN particles throughout the melted polymer. The melt is then force through the extruder nozzle to form a desired shape.

The present invention is also directed to a polymer blend comprising a base polymer, an effective amount of at least one foam cell nucleant and an effective amount of at least one fluoropolymer. The base polymer can be chosen from any processable polymer, especially those identified supra as preferred processable polymers.

EXAMPLES

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

General Masterbatch Preparation Procedure.

Fluoroelastomer and boron nitride both in powdered form are combined in the appropriate ratio and mixed in a V-Blender with the intensifier bar on for 10 revolutions. The fluoroelastomer/BN mixture then combined with polyethylene, preferably also in powdered form. Mixed in an appropriate blender and then melt extruded and formed into pellets of various sizes.

The extrusion operation was conducted in a "one-pass" Farrel Continuous mixer followed by a melt extrusion pelletization process. Alternatively, the extrusion operation may be conducted in a twin-screw extrusion operation coupled with a pelletization process. The twin-screw operation may utilize one or two passes through the twin-screw extrusion step. This can be with both passes at a high concentration of the fluoroelastomer/BN mixture. Or, more appropriately, it can be conducted with the first pass at a high concentration and the second pass at a lower concentration. In either case, such a double pass extrusion may be used to insure excellent distribution of the fluoroelastomer/BN in the polyolefin within the master batch.

Superior dispersion of the BN in the master batch has been realized by using powdered or ground up polyethylene and one pass through a twin screw extruder.

The following provides additional details of master batch preparation utilizing the twin screw extruder.

Feeding Technique: A precision Kaytron® weigh belt feeder, or equivalent, shall be used for the fluoroelastomer/BN mixture. A similar feeder will be used for the polyolefin resin. In this set up, two feeders are used for the extrusion. Alternately, the fluoroelastomer/BN mixture and the polyolefin resin may be mixed in appropriate mixing equipment. This mixing could be done in a ribbon blender or a drum tumbler. Subsequent feeding to the twin-screw extruder shall be via a precision weigh-belt feed system. In this case, one feeder is used with the extrusion set up.

Twin-Screw Design The twin screw consisted of feed elements, one set of kneading blocks and one set of reverse elements. The size (diameter) of the twin-screw extruder can be selected according to the amount of master batch requested, as is known in the art. The extrusion process shall include down stream pelletizing of the extruded melt stream. Either strand cutting or melt cutting may be employed. Melt filtration (400, 200 or a 100-mesh pack) is an option that may be considered; assuming the increased melt pressure can be tolerated. Extrusion may be repeated, with additional polyolefin resin in the second extrusion.

Comparative testing was conducted utilizing various amounts and combinations of BN, fluoroelastomer and Exxon's Exceed™ polyethylene blends. The data show that the various embodiments of the present invention enhance extrusion rate of blown film and film quality (e.g., clarity and gauge). The magnitude of this enhancement is surprising because the beneficial effects of a relatively low content of BN with respect to fluoroelastomer (fluoroelastomer rich). Use of the combination is an effective manner of reducing melt pressure. A melt pressure reduction allows the rate increase. In this case, the increase was almost 200 percent. Furthermore, film clarity changes from the hazy film associated with virgin resin to a nearly crystal clear film. And further, the friction coefficient of the melt with respect to the die may be specifically chosen by utilizing varying levels of BN and fluoroelastomer, within the fluoroelastomer-rich regime.

Figure 1:
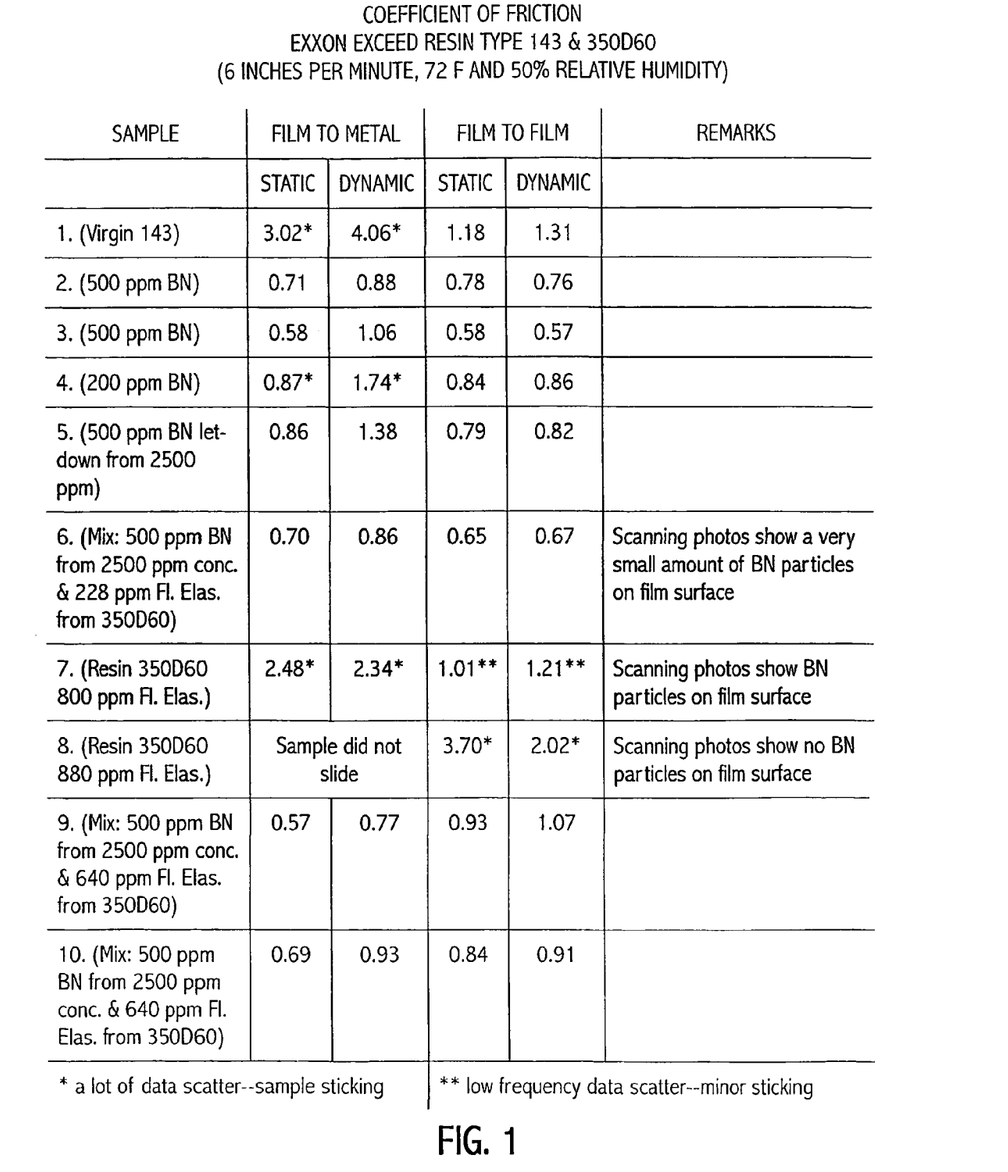
FIG. 1 is a table comparing coefficient of friction data among various blown films.
Figure 2:
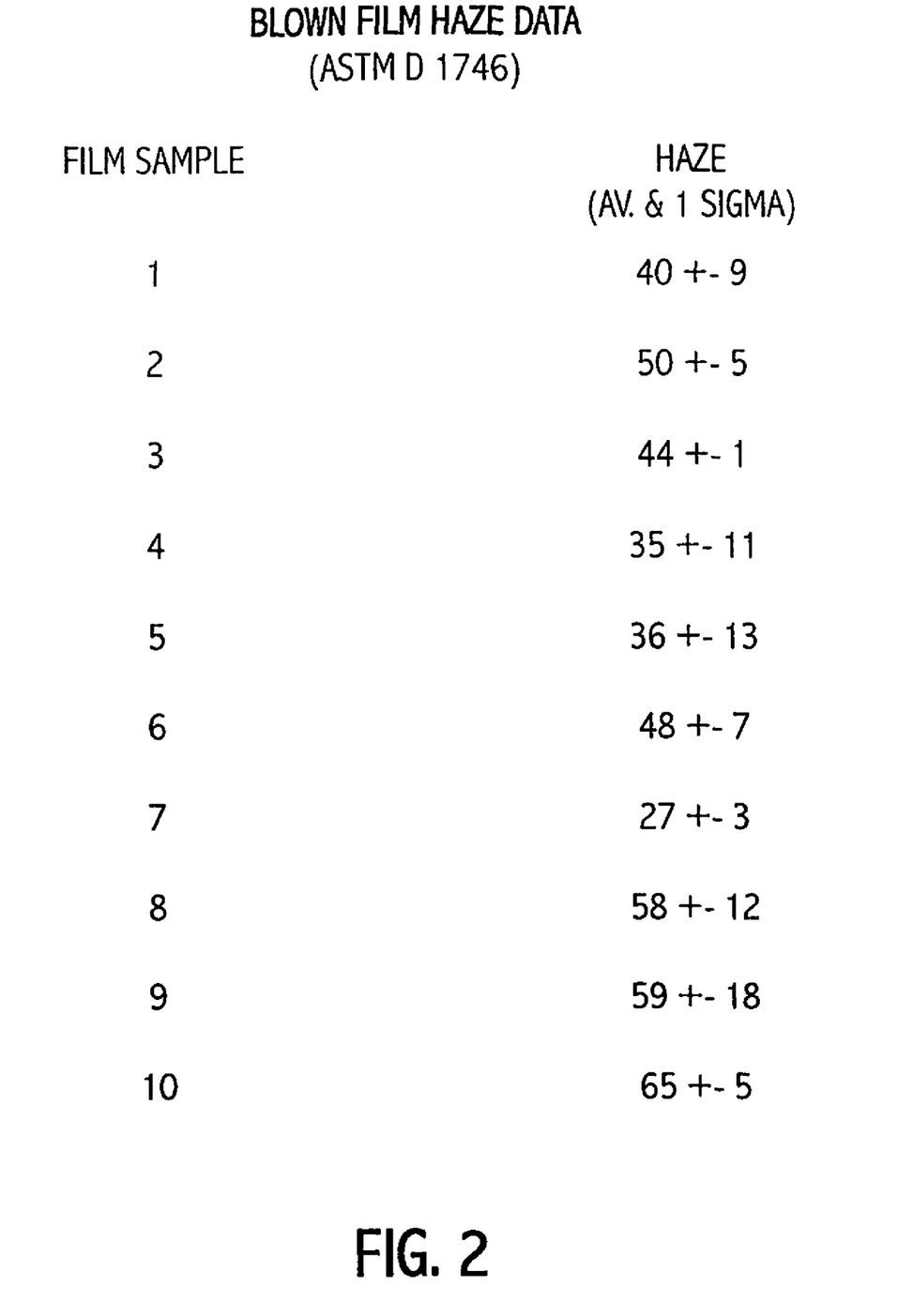
FIG. 2 is a table comparing haze data among various blown films.
Figure 3:
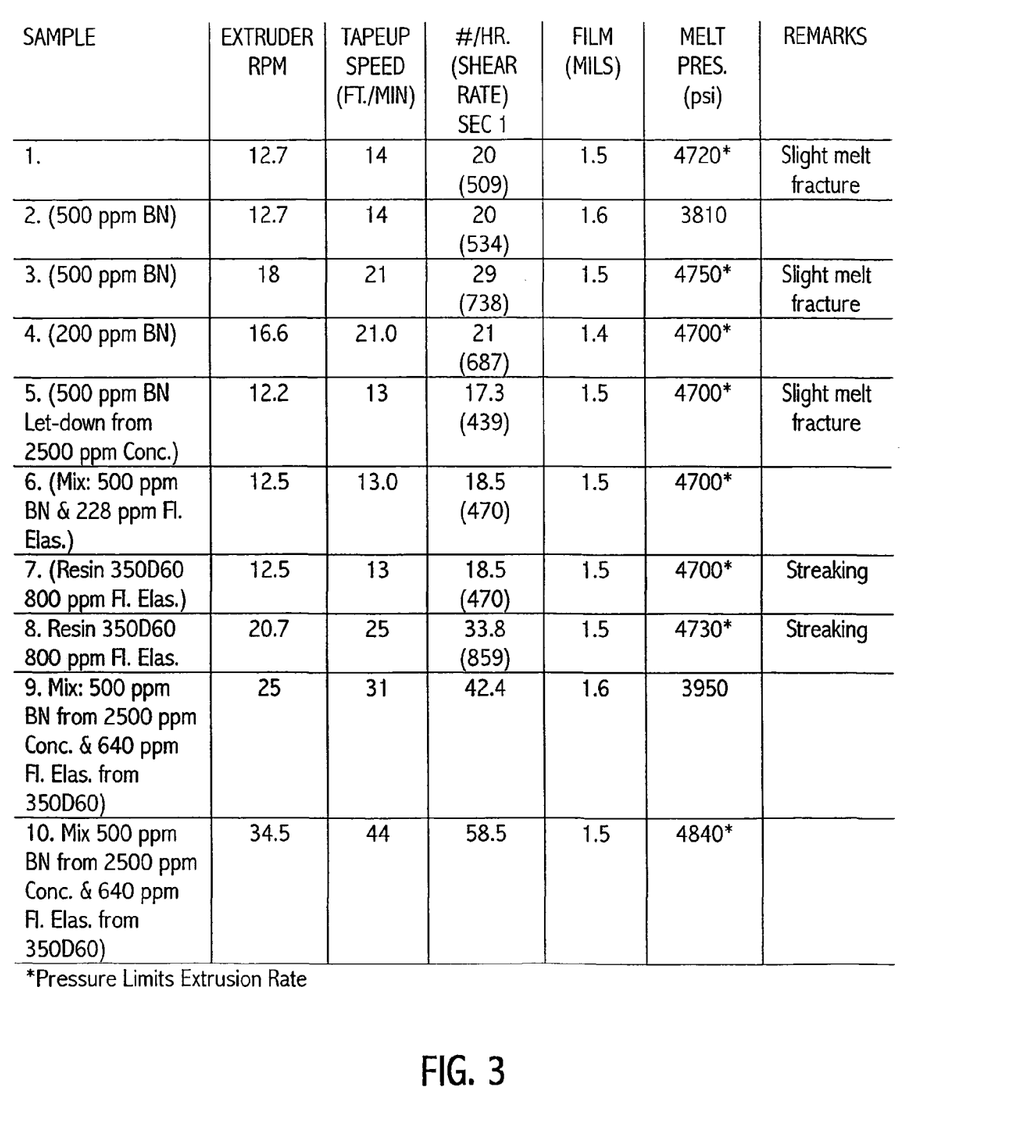
FIG. 3 is a table comparing relevant data among various blown films.
Figure 4:
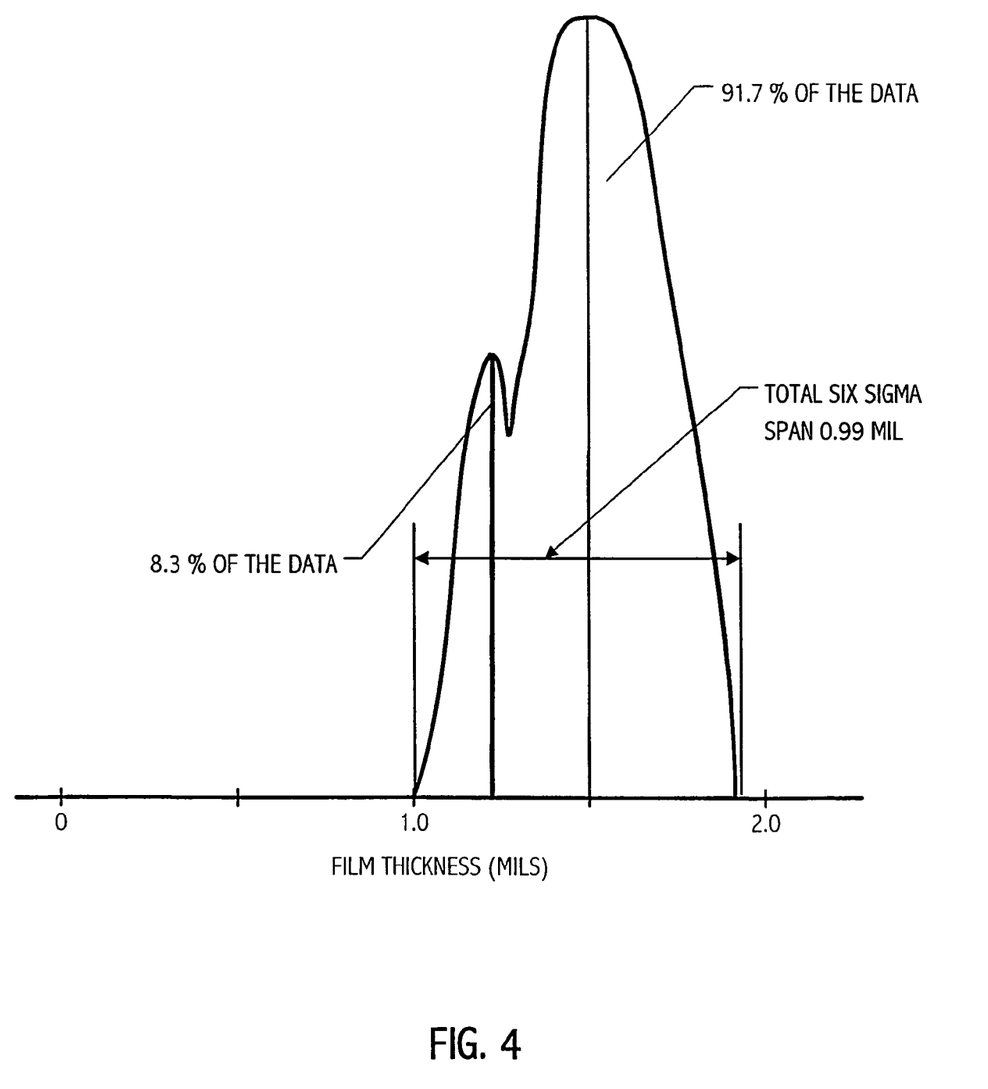
Figure 5:
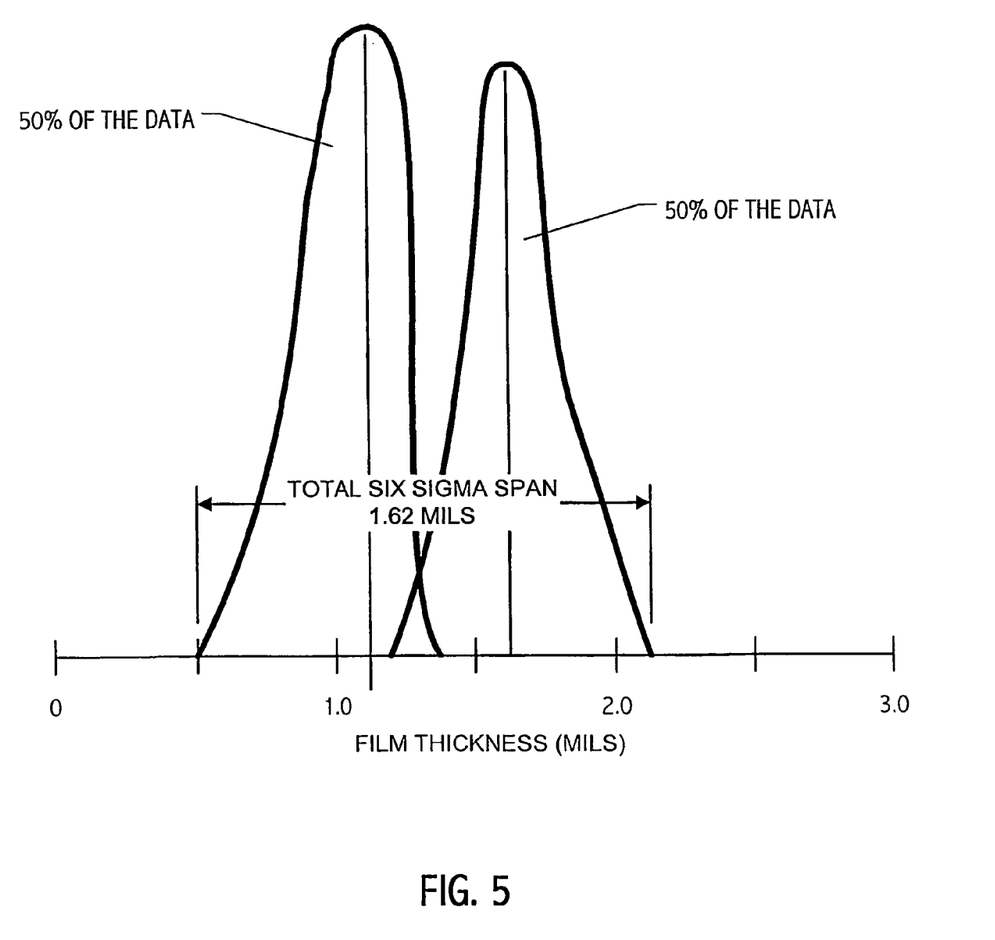

Fluoroelastomer by itself in polyethylene 350D60 (a commercial product of Exxon) yields a streaky extruded film. The streakiness is generally absent when BN and fluoroelastomer are used simultaneously in resin 143. Reference is made to FIGS. 1-5, which present various data relative to the testing.

Based on these data, it was found that the following process aid combinations exhibited many of the benefits recited herein:

| Fluoroelastomer (ppm) | 320 | 640 | 650 | 650 | 136 |
|---|---|---|---|---|---|
| Boron Nitride (ppm) | 80 | 500 | 250 | 100 | 65 |

The foregoing examples all are rich in fluoroelastomer (relative to BN), all having fluoroelastomer to BN ratios greater than 1:1, and in particular 4:1, 1.3:1, 2.6:1, 6.5:1, 2.1:1. Besides the rate increase noted, precise control of film thickness can be achieved while at the same time producing crystal clear film. Furthermore, the following advantages were also observed:

Coefficient of friction (static and dynamic) is reduced compared to film of virgin polyethylene (type 143).
Film to metal coefficient is reduced by a factor of three.
Film to film coefficient is reduced by a factor of 0.25.
The coefficients associated with polyethylene film containing only fluoroelastomer (commercial resin 350D60) by itself are significantly higher, even to the point of sticking and not sliding. On the other hand, the processing aid containing the combination of BN and fluoroelastomer according to the examples herein are effective to reduce the coefficient of friction to such a degree as to reduce or even overcome the need for conventionally used slip additives.
Film surface is smoother.
Control of film thickness (average and six sigma) around the circumference of the 1.5-mil film is significantly better.
Boron nitride improved control by a factor of two.
Fluoroelastomer improves control by a factor of two, also.
However, boron nitride and fluoroelastomer together improved the thickness variations by another factor of two compared to that achieved with the fluoroelastomer alone
Film haze is reduced significantly by the combination.
It is contemplated that BN acts as an anti-blocking agent in extruded film (prevents film from sticking to itself when the blown film is laid flat.) Resin manufacturers currently add ingredients like silica to achieve this anti-blocking feature.
Melt pressure is lowered. This is the main key to enhancing extrusion rate as the blown film set-up is usually limited by how much pressure (e.g., 4,700 psig with the equipment used) the die holder can endure before leaking melt.
No die drool is noticed at the lips of the circular die.
Melt fracture is postponed to higher shear rates.
Boron nitride and Fluoroelastomer together according to the combinations described herein offers a 190% increase in extrusion rate over virgin melt processable polymer.
Essentially no streaking of the film occurs. Film streaking is a serious problem with 350D60 that contains only the fluoroelastomer extrusion aid.
Overall film quality is improved with BN. However, the very best quality (crystal clear and excellent thickness control) is realized with the combination of BN and fluoroelastomer together, within the fluoropolymer rich regime as described herein.

It will be understood that each of the elements described above, or two or more together, may also find utility in applications differing from the types described herein. While the invention has been illustrated and described as embodied in a polymer processing aid and method for processing polymers, it is not intended to be limited to the details shown, since various modifications and substitutions can be made without departing in any way from the spirit of the present invention. For example, the polymer may contain various additives and modifiers, such as UV stabilizers, anti-blocking agents, foaming agents, and fillers (e.g., minerals), to adjust its properties. In addition, while fluoropolymers, and in particular fluoroelastomers, have been described above as being an integral component of the processing aid, the polymer component of the processing aid is generally directed to any fluorine-containing polymers, which group includes not only fluoropolymers as described above, but other materials such as fluorochloropolymers and halogenated polymers containing fluorine. In this regard, a distinction is made between the polymer making up the bulk of the feedstock polymer blend (the base or bulk polymer) and the fluorine-containing polymer which is a portion of the processing aid. In this regard, the base polymer is distinct from and a different polymer composition than the fluorine-containing polymer of the processing aid. For example, if the melt processable bulk polymer contains a fluorine, it is typically a fluoroplastic, while the fluorine containing polymer of the processing aid is a fluoroelastomer.

Although many examples of various alternative chemicals, materials, and components have been presented throughout this specification, the omission of a possible item is not intended to specifically exclude its use in or in connection with the claimed invention. Further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A polymer composition, comprising:
   a melt processable polymer comprised of polyolefin; and
   a processing aid comprising a fluorine-containing polymer and a foam cell nucleant comprised of BN, wherein the processing aid has a ratio of fluorine-containing polymer to foam cell nucleant, the ratio being at least 2:1, and the total content of the processing aid is less than about 1300 ppm in the polymer composition.

2. The composition of claim 1, wherein the ratio is no greater than 6.5:1.

3. The composition of claim 1, wherein the processing aid has a ratio is at least 3:1.

4. The composition of claim 2, wherein the ratio is no greater than 4:1.

5. The composition of claim 1, wherein the total content of the processing aid is less than about 1000 ppm in the polymer composition.

6. The composition of claim 1, wherein the total content of the processing aid is less than about 800 ppm in the polymer composition.

7. The composition of claim 1, wherein the total content of the processing aid is less than about 500 ppm in the polymer composition.

8. The composition of claim 1, wherein said a fluorine-containing polymer is a fluoropolymer.

9. The composition of claim 8, wherein the fluoropolymer is a fluoroelastomer.

10. The composition of claim 1, wherein the fluorine-containing polymer is present in an amount less than 800 ppm in the polymer composition.

11. The composition of claim 2, wherein the BN is comprised of hexagonal BN

12. The composition of claim 11, wherein the hexagonal BN comprises a delaminated BN.

13. The composition of claim 11, wherein the hexagonal BN has a $B_2O_3$ content not less than about 0.5 wt. %.

14. The composition of claim 1, wherein the polymer composition contains less than 500 ppm BN.

15. The composition of claim 14, wherein the BN is present in an amount less than 200 ppm.

16. The composition of claim 14, wherein the BN is present in an amount less than 100 ppm.

17. The composition of claim 1, wherein the melt processable polymer comprises an elastomer blend containing linear polyolefin.

18. The composition of claim 1, wherein the melt processable polymer comprises linear polyethylene.

19. The composition of claim 18, wherein the melt processable polymer comprises linear low-density polyethylene.

20. The composition of claim 1, wherein the melt processable polymer comprises polypropylene.

21. The composition of claim 1, wherein the composition is in the form of an extruded product.

* * * * *

UNITED STATES PATENT AND TRADEMARK OFFICE
CERTIFICATE OF CORRECTION

PATENT NO. : 7,662,324 B2  
APPLICATION NO. : 10/476364  
DATED : February 16, 2010  
INVENTOR(S) : Pruss et al.

Page 1 of 1

It is certified that error appears in the above-identified patent and that said Letters Patent is hereby corrected as shown below:

Front page, Abstract, Line 2, please change "the stops of providing" to --the steps of providing-- as shown on the Abstract as filed October 30, 2003

Signed and Sealed this  
Twelfth Day of March, 2013

Teresa Stanek Rea  
*Acting Director of the United States Patent and Trademark Office*